(12) United States Patent
Bell

(10) Patent No.: US 10,308,235 B2
(45) Date of Patent: Jun. 4, 2019

(54) OFF-BOARD POWER TRANSMISSION

(71) Applicant: Ford Global Technologies, LLC, Dearborn, MI (US)

(72) Inventor: Christopher W. Bell, Livonia, MI (US)

(73) Assignee: Ford Global Technologies LLC, Dearborn, MI (US)

(*) Notice: Subject to any disclaimer, the term of this patent is extended or adjusted under 35 U.S.C. 154(b) by 93 days.

(21) Appl. No.: 15/470,345

(22) Filed: Mar. 27, 2017

(65) Prior Publication Data
US 2018/0273022 A1 Sep. 27, 2018

(51) Int. Cl.
*B60W 20/13* (2016.01)
*B60K 6/22* (2007.10)
*B60W 10/06* (2006.01)
*B60W 10/26* (2006.01)
*B60K 6/48* (2007.10)
(Continued)

(52) U.S. Cl.
CPC ............. *B60W 20/13* (2016.01); *B60K 6/22* (2013.01); *B60K 6/48* (2013.01); *B60L 1/006* (2013.01); *B60W 10/06* (2013.01); *B60W 10/26* (2013.01); *B60L 53/20* (2019.02); *B60L 53/60* (2019.02); *B60W 2510/244* (2013.01); *B60W 2710/06* (2013.01); *B60W 2710/244* (2013.01); *B60Y 2200/92* (2013.01); *B60Y 2300/182* (2013.01); *B60Y 2300/43* (2013.01); *B60Y 2300/91* (2013.01); *B60Y 2400/61* (2013.01);
(Continued)

(58) Field of Classification Search
CPC ...... B60W 20/13; B60W 10/26; B60W 10/06; B60W 2710/244; B60W 2710/06; B60W 2510/244; B60K 6/22; B60Y 2300/43; B60Y 2400/61; B60Y 2300/91; B60Y 2300/182; B60Y 2200/92; B60L 11/1838; B60L 11/1811; Y10S 903/93
See application file for complete search history.

(56) References Cited

U.S. PATENT DOCUMENTS

| 8,698,330 | B2 | 4/2014 | Taketomi | |
|---|---|---|---|---|
| 2013/0219084 | A1* | 8/2013 | Wu | B60L 11/1838 710/11 |
| 2015/0112522 | A1* | 4/2015 | Liang | B60W 10/06 701/22 |

FOREIGN PATENT DOCUMENTS

CN 205610331 U 9/2016

OTHER PUBLICATIONS sales@converdant.biz, Con VerDant Vehicles, Expanding the "Plug-Out" Series!, Hybrid Cars as Emergency Power Generators Now With 5kva 240/120v Split Phase, and Prius Plug-in Ready!!, 2 pages.

(Continued)

*Primary Examiner* — Nadeem Odeh
*Assistant Examiner* — Michael V Kerrigan
(74) *Attorney, Agent, or Firm* — David Kelley; Brooks Kushman P.C.

(57) ABSTRACT

A vehicle includes a power plant, an electrical port, and a controller. The controller is configured to transmit a signal to the inverter via a conductor of the port indicating a maximum power available. The signal may be transmitted responsive to indication of an off-board inverter being plugged into the port. The controller may be further configured to complete a circuit between the power plant and the inverter. The circuit may be completed responsive to an expected predefined reduction in peak voltage of the signal caused by the inverter.

17 Claims, 3 Drawing Sheets

(51) Int. Cl.
    *B60L 1/00*         (2006.01)
    *B60L 53/20*      (2019.01)
    *B60L 53/60*      (2019.01)

(52) U.S. Cl.
    CPC ........ *Y02T 10/7005* (2013.01); *Y02T 10/7241* (2013.01); *Y02T 90/14* (2013.01); *Y10S 903/93* (2013.01)

(56) References Cited

OTHER PUBLICATIONS

Pratt, Rick, P.I., Vehicle Communications and Charging Control, Pacific Northwest National Laboratory, Project ID# VSS142, PNNL-SA-102303, 25 pages.

\* cited by examiner

OFF-BOARD POWER TRANSMISSION

TECHNICAL FIELD

The present disclosure relates to off-board power transmission and supply.

BACKGROUND

Vehicles create energy using a variety of means. This energy may be used to propel the vehicle or supply onboard, auxiliary loads. Loads are typically provided direct current (DC), and inverters may be employed to provide alternating current (AC). Onboard inverters having large output ratings can increase vehicle size and complicate heat dissipation. Additionally, invalid and unauthorized offboard inverters may be improperly connected to vehicle DC busses.

SUMMARY

A vehicle includes a power plant, an electrical port, and a controller. The controller is configured to transmit a signal to the inverter via a conductor of the port indicating a maximum power available. The signal may be transmitted responsive to indication of an off-board inverter being plugged into the port. The controller may be further configured to complete a circuit between the power plant and the inverter. The circuit may be completed responsive to an expected predefined reduction in peak voltage of the signal caused by the inverter.

A method is performed by a controller of a vehicle. The method includes transmitting a signal to an inverter via a conductor of the port indicating a maximum power available. The signal is sent responsive to indication of an off-board inverter being plugged into an electrical port. The method includes completing a circuit between a power plant of a vehicle and the inverter. The circuit is completed responsive to an expected predefined reduction in peak voltage of the signal caused by the inverter.

A vehicle includes a power plant having a traction battery and an engine. The vehicle includes an electrical port and a controller. The controller is configured to transmit a signal to the inverter via a conductor of the port indicating a maximum power available. The signal may be transmitted responsive to indication of an off-board inverter being plugged into the port. The controller may be further configured to complete a circuit between the power plant and the inverter. The circuit may be completed responsive to an expected predefined reduction in peak voltage of the signal caused by the inverter. The controller is further configured to start the engine. The engine is started responsive to the inverter drawing a current greater than a predetermined threshold while the engine is off.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Modern vehicles have a power plant that is used to propel the vehicle and supply power to onboard loads. The power plant may include engines, batteries, capacitors, solar panels, fuel cells, or other generation devices. The generation devices may generate electric energy or other energy forms. Users may have further tasked the power plant to power off-board electronics by haphazardly connecting jumper cables to vehicle electric busses or other electrical outlets. For example, the vehicles DC bus may be used to jumpstart a car or energize an inverter. The inverter may be used to power electronics designed for utility electrical connections (e.g., 120/240 V connectors). These haphazard connections may allow unauthorized or unanticipated loads to draw improper amounts of energy from vehicle electrical busses. These loads may lead to vehicle malfunction or cause other issues to arise. The vehicle includes a port having a controller configured to transfer high current to off-board loads. The port may perform an authorization check before providing access to electrical busses. The vehicle may include a controller to monitor the energy transferred and properly operate the vehicle in response to the circumstances surrounding the energy transfer.

Figure 1:
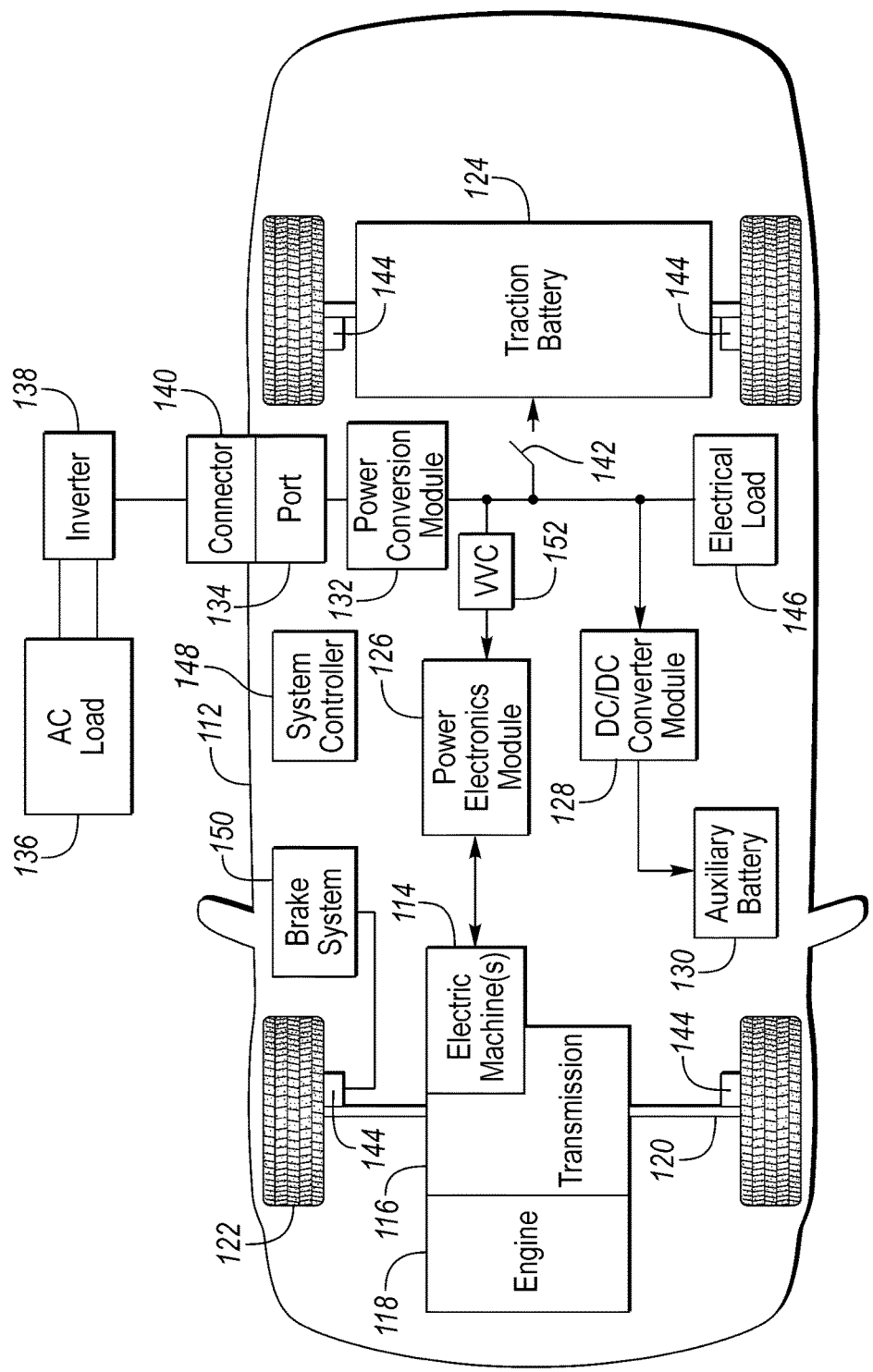
FIG. 1 is a schematic drawing of a vehicle having an electric machine and engine.

FIG. 1 depicts an electrified vehicle 112 that may be referred to as a plug-in hybrid-electric vehicle (PHEV). The vehicle may be any type of vehicle, including non-hybrid vehicles. The vehicle may be an internal combustion engine vehicle. The vehicle may be a plug-in electric vehicle. The vehicle may be a hybrid without plug-in capabilities. The vehicle 112 may comprise one or more electric machines 114 mechanically coupled to a hybrid transmission 116. The electric machines 114 may be capable of operating as a motor or a generator. In addition, the hybrid transmission 116 is mechanically coupled to an engine 118. The power plant of the vehicle may include any number of energy production or maintenance machines (e.g., engines, batteries, capacitors, solar panels, fuel cells, electric machines). The hybrid transmission 116 is also mechanically coupled to a drive shaft 120 that is mechanically coupled to the wheels 122. The electric machines 114 can provide propulsion and deceleration capability when the engine 118 is turned on or off. The electric machines 114 may also act as generators and can provide fuel economy benefits by recovering energy that would normally be lost as heat in a friction braking system. The electric machines 114 may also reduce vehicle emissions by allowing the engine 118 to operate at more efficient speeds and allowing the hybrid-electric vehicle 112 to be operated in electric mode with the engine 118 off under certain conditions. An electrified vehicle 112 may also be a battery electric vehicle (BEV). In a BEV configuration, the engine 118 may not be present. In other configurations, the electrified vehicle 112 may be a full hybrid-electric vehicle (FHEV) without plug-in capability.

A traction battery or battery pack 124 stores energy that can be used by the electric machines 114. The vehicle battery pack 124 may provide a high voltage direct current (DC) output. The traction battery 124 may be electrically coupled to one or more power electronic modules 126. One or more contactors 142 may isolate the traction battery 124 from other components when opened and connect the traction battery 124 to other components when closed. The power electronic module 126 is also electrically coupled to the electric machines 114 and provides the ability to bi-directionally transfer energy between the traction battery 124 and the electric machines 114. For example, a traction battery 124 may provide a DC voltage while the electric machine 114 may operate with a three-phase alternating current (AC) to function. The power electronic module 126 may convert the DC voltage to a three-phase AC current to operate the electric machine 114. In a regenerative mode, the power electronic module 126 may convert the three-phase AC current from the electric machine 114 acting as generators to the DC voltage compatible with the traction battery 124.

The vehicle 112 may include a variable-voltage converter (VVC) 152 electrically coupled between the traction battery 124 and the power electronic module 126. The VVC 152 may be a DC/DC boost converter configured to increase or boost the voltage provided by the traction battery 124. By increasing the voltage, current requirements may be decreased leading to a reduction in wiring size for the power electronic module 126 and the electric machine 114. Further, the electric machine 114 may be operated with better efficiency and lower losses.

In addition to providing energy for propulsion, the traction battery 124 may provide energy for other vehicle electrical systems. The vehicle 112 may include a DC/DC converter module 128 that converts the high voltage DC output of the traction battery 124 to a low voltage DC supply that is compatible with low-voltage vehicle loads. An output of the DC/DC converter module 128 may be electrically coupled to an auxiliary battery 130 (e.g., 12V battery) for charging the auxiliary battery 130. The low-voltage systems may be electrically coupled to the auxiliary battery 130. One or more electrical loads 146 may be coupled to the high-voltage bus. The electrical loads 146 may have an associated controller that operates and controls the electrical loads 146 when appropriate. Examples of electrical loads 146 may be a fan, an electric heating element and/or an air-conditioning compressor.

The electrified vehicle 112 may be configured to power an external AC Load 136. The external AC Load 136 may be connected through an electrical port 134. The external AC Load 136 may be electrically coupled to an inverter 138. The external AC Load 136 may be an electrical power distribution network or grid. The inverter 138 may provide circuitry and controls to regulate and manage the transfer of energy between the AC Load 136 and the vehicle 112. The system controller 148 may also provide or cooperate to control and regulate the energy transfer. The external AC Load 136 may provide DC or AC electric power to the inverter 138. The inverter 138 may have a connector 140 for plugging into a port 134 of the vehicle 112. The port 134 may be any type of port configured to transfer power from the inverter 138 to the vehicle 112. The port 134 may be electrically coupled to an on-board power conversion module 132. The power conversion module 132 may condition the power supplied to the inverter 138 to provide the proper voltage and current levels to the traction battery 124. The power conversion module 132 may interface with the inverter 138 to coordinate the delivery of power to the vehicle 112. The connector 140 may have pins that mate with corresponding recesses of the port 134. Alternatively, various components described as being electrically coupled or connected may transfer power using a wireless inductive coupling.

The port 134 may include a plurality of conductors. One of the conductors may be configured as a pilot connector. The pilot connector establishes a connection with the inverter 138 when it is plugged into the port 134, and before the vehicle 112 supplies power to the load 136. An authorization handshake is performed between the inverter 138 and the vehicle 112 to ensure the inverter 138 is authorized to receive power from the vehicle 112. The port 134 may also include a power conductor. The power conductor may be configured to transfer energy required by the inverter 138. Some inverters 138 may have large current draws (e.g., 100 A). The port 134 may include contactors to close the circuit including the power conductor after the inverter 138 is authorized. The vehicle may also include contactors similar to contactor 142 to isolate the traction battery 124 and auxiliary battery 130 from the port 134.

One or more wheel brakes 144 may be provided for decelerating the vehicle 112 and preventing motion of the vehicle 112. The wheel brakes 144 may be hydraulically actuated, electrically actuated, or some combination thereof. The wheel brakes 144 may be a part of a brake system 150. The brake system 150 may include other components to operate the wheel brakes 144. For simplicity, the figure depicts a single connection between the brake system 150 and one of the wheel brakes 144. A connection between the brake system 150 and the other wheel brakes 144 is implied. The brake system 150 may include a controller to monitor and coordinate the brake system 150. The brake system 150 may monitor the brake components and control the wheel brakes 144 for vehicle deceleration. The brake system 150 may respond to driver commands and may also operate autonomously to implement features such as stability control. The controller of the brake system 150 may implement a method of applying a requested brake force when requested by another controller or sub-function.

Electronic modules in the vehicle 112 may communicate via one or more vehicle networks. The vehicle network may include a plurality of channels for communication. One channel of the vehicle network may be a serial bus such as a Controller Area Network (CAN). One of the channels of the vehicle network may include an Ethernet network defined by Institute of Electrical and Electronics Engineers (IEEE) 802 family of standards. Additional channels of the vehicle network may include discrete connections between modules and may include power signals from the auxiliary battery 130. Different signals may be transferred over different channels of the vehicle network. For example, video signals may be transferred over a high-speed channel (e.g., Ethernet) while control signals may be transferred over CAN or discrete signals. The vehicle network may include any hardware and software components that aid in transferring signals and data between modules. The vehicle network is not shown in FIG. 1 but it may be implied that the vehicle network may connect to any electronic module that is present in the vehicle 112. A vehicle system controller (VSC) 148 may be present to coordinate the operation of the various components.

Figure 2:
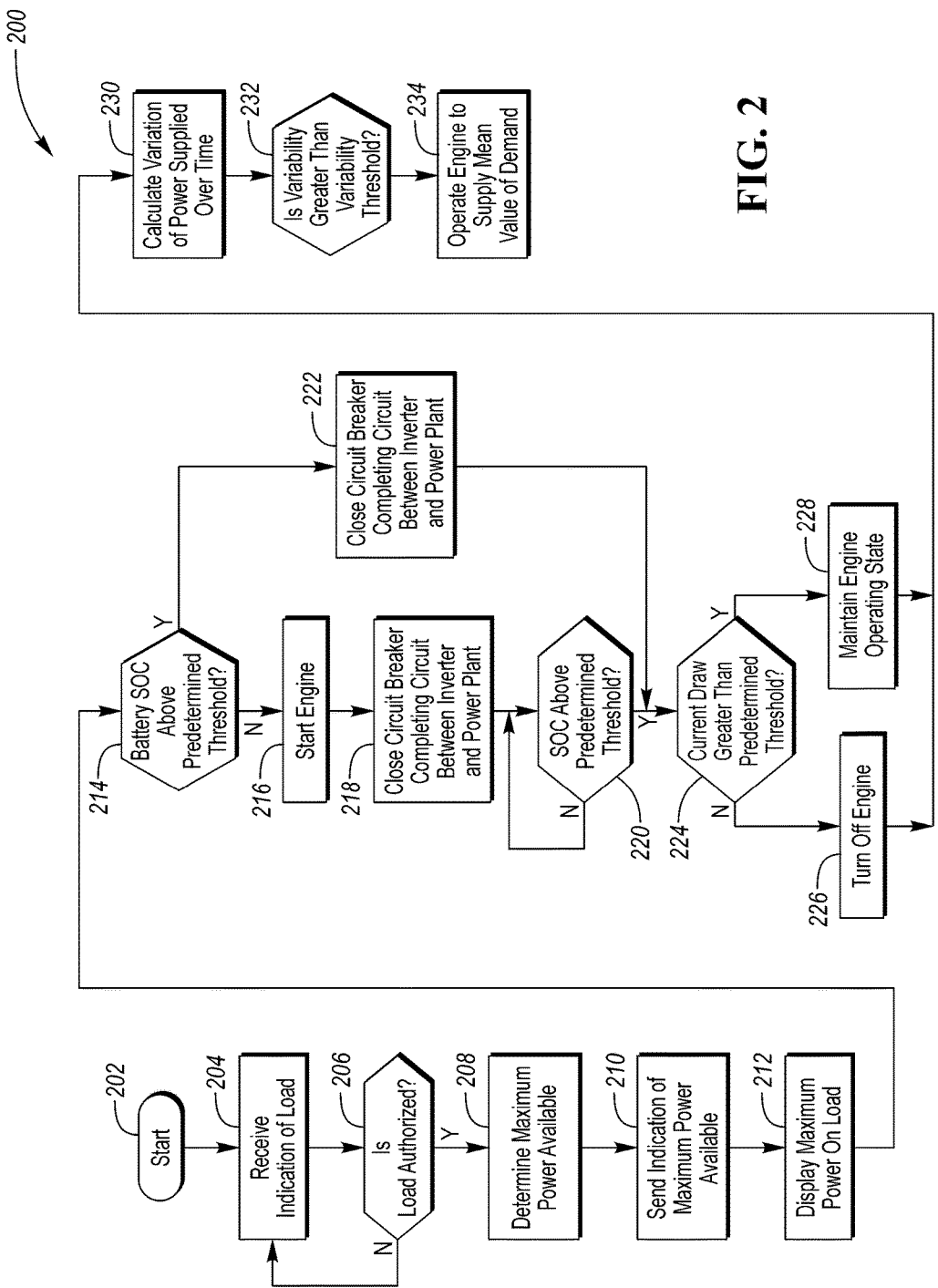
FIG. 2 is a flow chart of an inverter connection algorithm.

Referring to FIG. 2, a flow chart 200 is shown. The algorithm 200 beings with start 202. Indication of the load is received in step 204. Indication may include a pilot connector being configured to complete a circuit with the vehicle. A nominal voltage (e.g., 12 V) may be used to test whether the circuit has been closed by the pilot connector. The pilot connector may include a predetermined resistance or resistive element. The inverter may be authorized in step 206 by an indication of a predetermined voltage drop based on the resistance. The authorization protocol may be as simple as measuring a voltage drop over the connection to determine whether a predetermined resistance is present. The authorization protocol may include a telecommunications handshake and an exchange of predefined keys. The authorization protocol may include transmission of a particular waveform to identify an authorized inverter. The authorization process can ensure that the inverter is valid and compatible with the vehicle.

After a device is authorized, the vehicle may determine the maximum power available. The maximum power available to the inverter 138 may be an absolute maximum power value that the power plant can produce. In other embodiments, the maximum power available to the inverter 138 may be adjusted. The maximum power available may be adjusted by a variety of factors. A user may configure output to the inverter through a vehicle human machine interface such that output is limited to one or more of the power sources. For example, the inverter 138 may be configured to draw power from only the traction battery 124. In such a case, the maximum power available may be the current capacity of the battery. In other embodiments the maximum power available may be adjusted based on the capacity of the inverter 138. For example, the inverter 138 may communicate with the vehicle 112, its power output rating using the pilot conductor. The maximum power available may then match the power output rating.

The maximum power available may be communicated to the inverter using PWM signal in step 210. Other means of communication may be used. The controller may send PWM signals on the pilot conductor circuit to indicate the power available from a threshold. Current thresholds may be predefined and correspond to the duty cycle of the PWM signal. The power available to the inverter 138 may be displayed for the user through in-vehicle interfaces or a display screen on the inverter in step 212.

As an ongoing process, the system controller 148 may be configured to monitor the state of charge (SOC) of the battery 124, in step 214. If the SOC is above a predetermined threshold, the vehicle 112 may supply the inverter 138 load 136 using energy retained in the traction battery 124 in step 222. If the SOC is below a predetermined threshold, the system controller 148 may start the engine in step 216. The vehicle 112 may then supply the inverter 138 load 136 with the entire power plant, which includes the engine 118 and the traction battery 124. Meaning, energy generated by the engine 118 is converted into electric current via the electric machine 114 and power electronics module 126. The engine 118 may be operated at an optimal RPM to improve fuel economy. The engine 118 may be operated until the SOC is above a predetermined threshold. The threshold to start the engine 118 may be different than the threshold to stop the engine 118.

As an ongoing process, the system controller 148 may be configured to detect or predict the current draw in step 224. Power ratings of the inverter 138 may be transmitted during the handshake or connection phase and incorporated in the prediction. A user may input a predicted current draw via a human machine interface of the inverter 138 or the vehicle 112. If the predicted or determined current draw is greater than a predetermined threshold, the system controller 148 may select a preferred operating state. For example, the system controller 148 may determine that anticipated current draw of the inverter 138 is 50 A and that the traction battery 124 has 2000 Ah (amp-hours) of stored energy. The system controller 148 may isolate the traction battery 124 such that the traction battery 124 supplies the inverter 138 because the battery 124 can supply the load for 10 hours. The system controller 148 may supply the inverter 138 with the traction battery 124 even if the SOC is below the threshold, if the battery 124 can supply the inverter 138 for greater than predetermined period of time and turn off the engine in step 226. The system controller 148 may be configured to maintain the engine 118 operating state if the current draw is greater than a predetermined threshold in step 228. The engine 118 may be maintained or started if the current draw requires additional current that cannot be provided by the battery. It should be appreciated that power plant can adjust power sources to meet the demands of the load. The system controller 148 may be configured to minimize fossil fuel consumption and battery 124 charging events.

As an ongoing process, the system controller 148 may be configured to calculate variation in current drawn by the inverter 138. Variation may be calculated using a variety of methods known in the art. For example, standard deviation or variance may be used to identify when current drawn by the inverter 138 is unsteady. Transient currents may reduce the efficiency of the engine 118, if it is generating energy for the load. For example, high transients may cause the engine 118 to drastically vary RPMs. Engine 118 fuel consumption may be minimized at a particular RPM. During high transient conditions the engine 118 may be configured to operate at a given RPM instead of following demand of the load. The traction battery 124 may be used to buffer the excess or insufficient energy provided by the engine 118. Meaning, a demand of the inverter 138 having a variability greater than a variability threshold may cause the system controller 148 to operate the engine 118 to supply a mean value of the demand and operate the battery to supply a difference between the demand and mean value. In another embodiment, the system controller 148 may operate the engine 118 at a predetermined, efficient value and employ the traction battery 124 to supply the difference between the supply by the engine 118 and the demand by the inverter 138. The engine 118 may be set to the predetermined value and the maximum power available may be reduced to meet the output by the engine 118 alone. The system controller 148 may further reduce the maximum power available when the demand by the inverter 138 has a high variance. The maximum power available may be limited by a current regulator or some other implement. It should be appreciated that the engine and battery may be interchanged by other power production elements as disclosed above.

Figure 3:
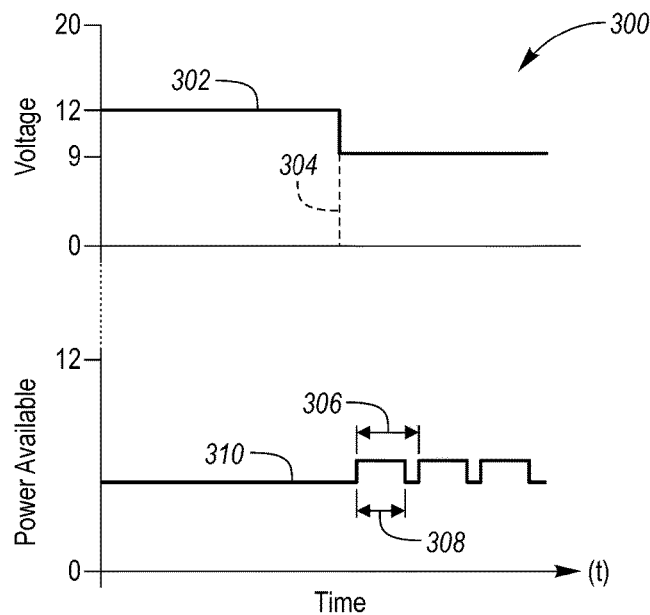
FIG. 3 is a graph depicting an inverter connection signal and maximum power available signal.

Referring to FIG. 3, a graph 300 is shown. The pilot circuit voltage 302 is shown over time. The pilot circuit voltage 302 is 12 V during normal operation. After connection of a pilot conductor 304 including a predetermined resistance, the circuit has a voltage drop of 3 V to 9 V. This expected predefined reduction in peak voltage 302 indicates that an authorized inverter 138 is attached to the port 134. The system controller 148 may close contactors to complete a circuit between the power plant 124 and the inverter 138. The vehicle 112 and inverter 138 may communicate the maximum power available or maximum power rating, respectively, using the method shown in pilot signal 310. The pilot signal 310 has a period 306. The pilot signal 310 may be pulse width modulated (PWM) to bi-directionally communicate between the inverter 138 and vehicle 112. The pulse width 308 may coincide with a predetermined power capability of the inverter and vehicle 112, respectively.

Figure 4:
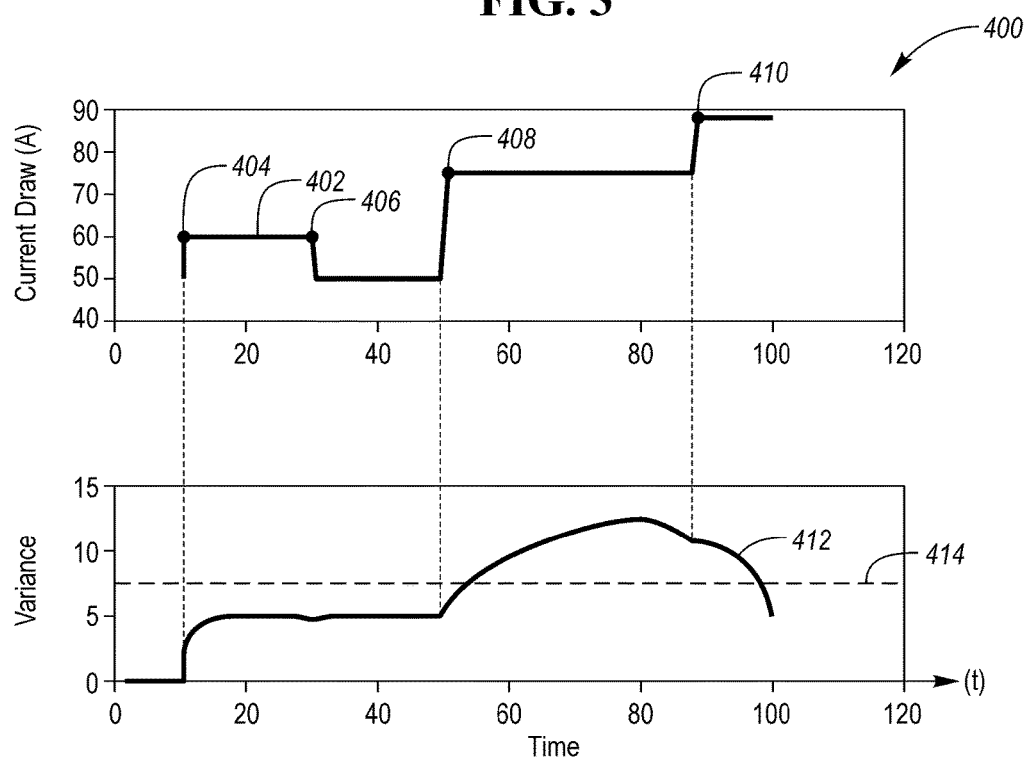
FIG. 4 is a graph depicting current drawn by the inverter and a variance of the current draw.

Referring to FIG. 4, a graph 400 is shown. The graph 400 includes a current draw 402 by the inverter 138. The current draw 402 by the inverter 138 changes over time. For example, a tailgate party may have a base current draw of 50 A form the inverter 138 for refrigerators and radios. After connection at point 404 of a television to the inverter 138, the current draw 402 may increase to 60 A. The television may be disconnected at point 406, returning the current draw 402 to 50 A. At point 408, a heater may be connected to the inverter 138, increasing the current drawn to 75 A. At point 410, the television may be reconnected to the inverter 138, increasing the current drawn to 88 A. Curve 412 indicates the variance or standard deviation of the current draw 402 over time. The calculation window (e.g., number of samples used) may be rolling in time, and the last 50 samples may be used.

The words used in the specification are words of description rather than limitation, and it is understood that various changes may be made without departing from the spirit and scope of the disclosure. As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A vehicle comprising:
a power plant;
an electrical port; and
a controller configured to,
responsive to indication of an off-board inverter being plugged into the port, transmit a signal to the inverter via a conductor of the port indicating a maximum power available,
responsive to an expected predefined reduction in peak voltage of the signal caused by the inverter, complete a circuit between the power plant and the inverter, and
limit power supplied to the inverter to less than the maximum power available based on a demand of the inverter having a variability greater than a variability threshold such that as the variability increases, the power supplied decreases.

2. The vehicle of claim 1, wherein the power plant includes a traction battery and an engine, and wherein the controller is further configured to, responsive to the inverter drawing a current greater than a predetermined current threshold while the engine is off, start the engine.

3. The vehicle of claim 1, wherein the power plant includes a traction battery and an engine, and wherein the controller is further configured to, responsive to a state of charge of the battery falling below a predetermined state of charge threshold while the engine is off, start the engine.

4. The vehicle of claim 1, wherein the power plant includes a traction battery and an engine, and wherein the controller is further configured to, responsive to the variability of the demand of the inverter exceeding the variability threshold, operate the engine to supply a mean value of the demand and operate the battery to supply a difference between the demand and the mean value.

5. The vehicle of claim 1, wherein the power plant includes a traction battery and an engine, and wherein the controller is further configured to, responsive to the variability of the demand of the inverter exceeding the variability threshold, operate the engine to supply a constant output.

6. The vehicle of claim 5, wherein the controller is further configured to operate the battery to supply a difference between the demand and the constant output.

7. A method comprising:
by a controller,
responsive to an inverter located off-board a vehicle being plugged into an electrical port of the vehicle, transmitting a signal to the inverter indicating a maximum power available;
responsive to an expected predefined reduction in peak voltage of the signal caused by the inverter, completing a circuit between a power plant of the vehicle and the inverter; and
responsive to a demand of the inverter having a variability greater than a variability threshold, operating an engine to supply constant output.

8. The method of claim 7 further comprising, limiting power supplied to the inverter to less than the maximum power available based on the variability of the demand of the inverter exceeding the variability threshold such that as the variability increases, the power supplied decreases.

9. The method of claim 7 further comprising, responsive to the inverter drawing a current greater than a predetermined current threshold while the engine of the power plant is off, starting the engine.

10. The method of claim 7 further comprising, responsive to a state of charge of a battery of the power plant falling below a predetermined state of charge threshold while the engine of the power plant is off, starting the engine.

11. The method of claim 7 further comprising, responsive to the variability of the demand of the inverter exceeding the variability threshold, operating the engine of the power plant to supply a mean value of the demand and operating a battery of the power plant to supply a difference between the demand and the mean value.

12. The method of claim 7 further comprising operating a battery of the power plant to supply a difference between the demand and the constant output.

13. A vehicle comprising:
a power plant including a traction battery and an engine;
an electrical port; and
a controller configured to,
responsive to indication of an off-board inverter being plugged into the port, transmit a pulse width modulation signal to the inverter via a conductor of the port indicating a maximum power available,
responsive to an expected predefined reduction in peak voltage of the signal caused by the inverter, complete a circuit between the traction battery and the inverter, and
responsive to the inverter drawing a current greater than a predetermined threshold while the engine is off, start the engine.

14. The vehicle of claim 13, wherein the controller is further configured to, responsive to the inverter having a draw greater than a predetermined draw threshold, close a circuit breaker to supply a portion of the a load using the engine.

15. The vehicle of claim 14, wherein the draw threshold is based on a state of charge of the battery.

16. The vehicle of claim 13, wherein the controller is further configured to, in response to a state of charge (SOC) of the battery falling below a predetermined SOC threshold, close a circuit breaker to supply a portion of a load to the inverter using the engine.

17. The vehicle of claim 13, wherein the port includes a first conductor for transmitting the signal and a second conductor for completing the circuit.

* * * * *